United States Patent [19]

Johnson

[11] Patent Number: 4,842,484
[45] Date of Patent: Jun. 27, 1989

[54] BLADE GEARING AND PITCH CHANGING MECHANISMS FOR COAXIAL COUNTERROTATING PROPELLERS

[75] Inventor: Kenneth O. Johnson, Cincinnati, Ohio

[73] Assignee: General Electric Company, Cincinnati, Ohio

[21] Appl. No.: 770,362

[22] Filed: Aug. 28, 1985

Related U.S. Application Data

[63] Continuation of Ser. No. 527,141, Aug. 29, 1983, abandoned.

[51] Int. Cl.[4] .............................................. B64C 11/48
[52] U.S. Cl. ..................................... 416/127; 416/129; 416/130; 416/157 B; 415/130
[58] Field of Search ................ 416/127, 128, 129, 130, 416/157 B, 159, 170 R; 415/130; 74/714, 665 K

[56] References Cited

U.S. PATENT DOCUMENTS

| | | | |
|---|---|---|---|
| 1,555,043 | 9/1925 | Wagner | 416/129 |
| 1,851,874 | 3/1932 | Seppeler | 431/197 |
| 1,920,674 | 8/1933 | Barbarou | 416/89 |
| 1,921,942 | 8/1933 | Ratier | 416/89 |
| 1,955,688 | 4/1934 | Seppeler | 416/89 |
| 2,228,638 | 1/1941 | Mercier | 416/130 X |
| 2,275,599 | 3/1942 | Armitage et al. | 416/129 |
| 2,394,299 | 2/1946 | Friedrich | 416/127 |
| 2,425,938 | 8/1947 | Hoover | 416/89 |
| 2,514,166 | 7/1950 | Ratie | 416/127 |
| 2,522,443 | 9/1950 | Gaubatz et al. | 416/129 X |
| 2,687,181 | 8/1954 | Tiedeman | 416/127 |
| 2,761,517 | 9/1956 | Detamore et al. | 416/127 X |
| 2,765,040 | 10/1956 | Darrah | 416/129 |
| 2,804,154 | 8/1957 | Treseder et al. | 416/127 X |
| 3,646,834 | 3/1972 | Davis | 74/665 K X |
| 3,869,221 | 3/1975 | Wildner | 415/130 |
| 3,873,236 | 3/1975 | Gall | 416/156 X |
| 4,090,812 | 5/1978 | Moran | 416/133 |
| 4,251,987 | 2/1981 | Adamson | 60/39.75 |
| 4,453,784 | 6/1984 | Kildea et al. | 415/111 X |
| 4,563,129 | 1/1986 | Pagluica | 416/129 |

FOREIGN PATENT DOCUMENTS

| | | | |
|---|---|---|---|
| 876041 | 5/1953 | Fed. Rep. of Germany | 416/129 |
| 876350 | 11/1942 | France | 416/127 |
| 893312 | 6/1944 | France | 416/127 |
| 949767 | 9/1949 | France | 416/127 |
| 52650 | 5/1942 | Netherlands | 416/129 |
| 112630 | 12/1942 | Sweden | 416/157 B |
| 246413 | 11/1947 | Switzerland | 416/127 |
| 685340 | 12/1952 | United Kingdom | 416/129 |
| 707814 | 4/1954 | United Kingdom | 416/127 |
| 885927 | 1/1962 | United Kingdom | 416/159 |
| 1047950 | 11/1966 | United Kingdom | . |
| 1309753 | 3/1973 | United Kingdom | . |
| 2007325 | 5/1979 | United Kingdom | . |

Primary Examiner—Robert E. Garrett
Assistant Examiner—George Kapsalas
Attorney, Agent, or Firm—Steven J. Rosen; Derek P. Lawrence

[57] ABSTRACT

A lightweight counterrotatable propeller system driven by a rotatable shaft is disclosed. The system includes first and second counterrotatable propellers, each propeller including a plurality of blades mounted on first and second hubs, respectively. Each blade is attached to the hub by means of a ball screw which converts centrifugal force on each of the rotating propeller blades into a pitch changing force. Gearing means for operatively connecting the shaft with each propeller are located between the propellers with a carrying member for one of the propellers forming an outer wall which radially bounds the gearing means. Additionally, nonrotating actuating means for changing propeller pitch are operatively connected to the blades of each of said first and second propellers through first and second thrust bearings, respectively.

13 Claims, 1 Drawing Sheet

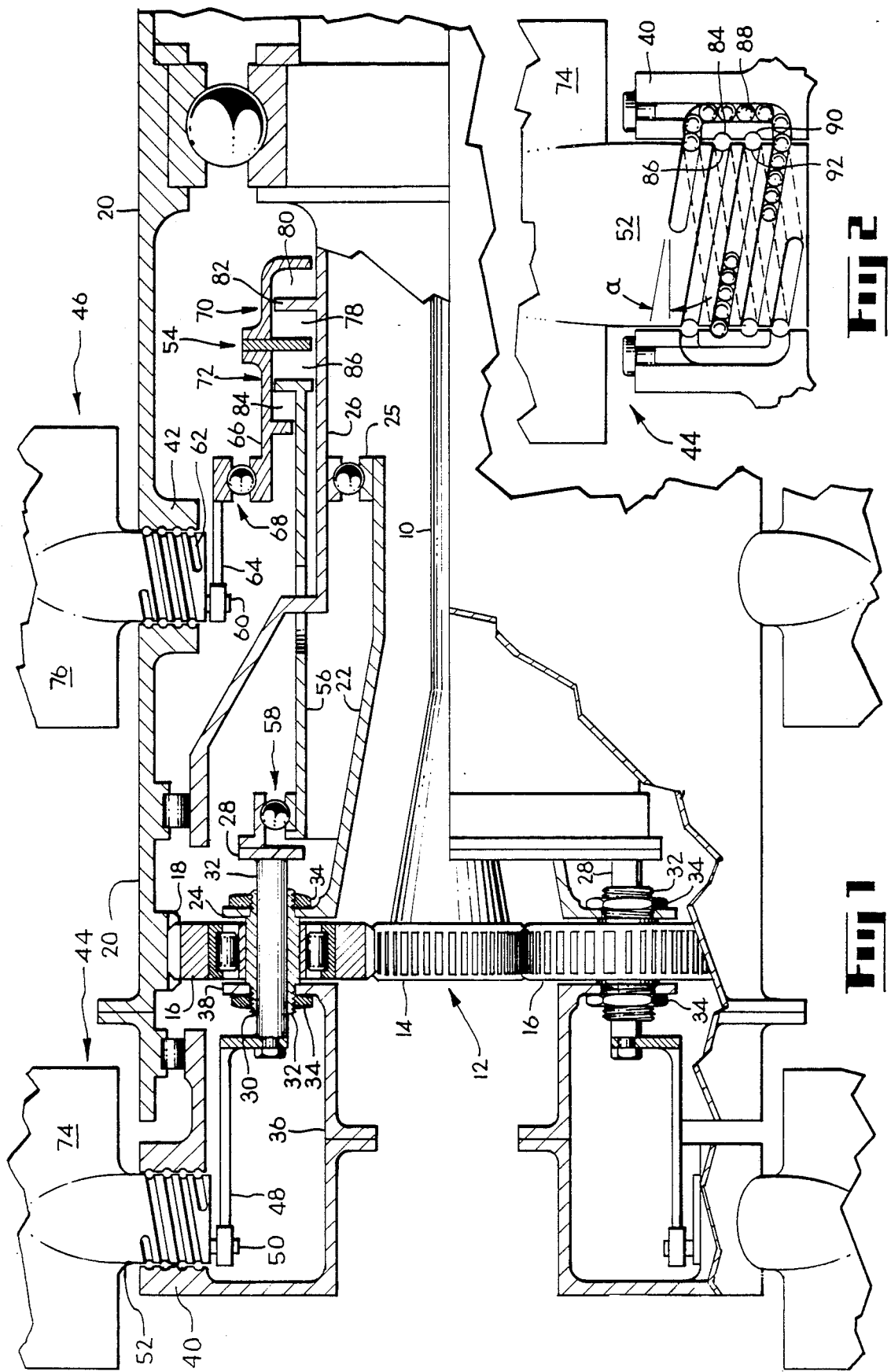

BLADE GEARING AND PITCH CHANGING MECHANISMS FOR COAXIAL COUNTERROTATING PROPELLERS

This is a continuation of co-pending application Ser. No. 527,141 filed on Aug. 29, 1983, now abandoned.

BACKGROUND OF THE INVENTION

This invention relates generally to aircraft propeller systems, and more particularly, to lightweight propeller gearing and pitch-changing mechanisms.

As a result of the energy crisis of the 1970's, significant research is being applied towards the goal of making aircraft engines more efficient. Of particular interest are turboprop engines. Such engines typically include a high pressure turbine for driving a compressor and a lower pressure or power turbine for driving a propeller. Propellers, as primary means of propulsion, are desirable because of superior performance and efficiency at subsonic speeds.

DESCRIPTION OF THE PRIOR ART

Conventional propeller systems require at least three components: a reduction gearbox for converting shaft rotational speed to blade rotational speed; a blade pitch-changing mechanism with fail-safe devices; and propellers. These components may account for more than one-half of the weight of a turboprop engine, and two-thirds of the maintenance costs of such engine.

In addition to the weight and cost penalties of conventional propeller systems, pitch actuation and fail-safe control present significant problems which are particularly acute on turboprop engines. Blade pitch control is a critical factor in optimizing engine thrust and performance at different operating conditions. Blade pitch is generally set between two extreme positions; namely, feather or coarse pitch and flat or fine pitch. The tendency of a rotating blade is to go to flat pitch in which the blade is substantially parallel to its direction of rotation. As the blades approach flat pitch they tend to speed up into a runaway condition. In such a condition, engine thrust is drastically reduced. In addition, the power turbine is in danger of being overdriven. Unlike a conventional reciprocating-type engine, the power turbine of a turboprop has little internal resistance to counteract runaway. Consequently, fail-safe mechanisms for preventing turboprop blades from going to flat pitch are of importance.

The mechanism for changing blade pitch has traditionally included a rotating actuator which typically employs hydraulic fluid. A problem with such a rotating actuator is the requirement necessitating a hydraulic slip ring to transfer fluid from the nonrotating supply. Slip rings tend to leak fluid resulting in inefficient operation. Moreover, rotating hydraulic actuators tend to centrifuge contaminants which may cause clogging. Nonrotating actuating mechanisms have been disfavored in part because of the relatively large size and weight of a mechanical nonrotating to rotating interface which can transmit the load needed to change blade pitch.

SUMMARY OF THE INVENTION

It is an object of the present invention to provide a new and improved lightweight propeller system.

Another object of the present invention is to provide a new and improved propeller system which integrates gearbox, pitch-changing mechanism and propeller into a single unit.

A further object of the present invention is to provide a new and improved pitch-changing mechanism for aircraft engine propeller blades.

It is another object of the present invention to provide a new and improved lightweight propeller system having counterrotating propellers.

Still a further object of the present invention is to provide a new and improved propeller system with an inherent fail-safe configuration which prevents a runaway condition.

It is yet a further object of the present invention to provide a new and improved propeller system which requires a relatively small actuating force to change propeller pitch.

One form of the present invention comprises a lightweight propeller system. The propeller system includes first and second counterrotatable propellers, each of which includes a plurality of blades mounted in first and second ball screw hubs respectively. First and second carrier members are connected to the first and second hubs, respectively. The carrier members are operatively connected to a drive shaft through gearing means. The gearing means is bounded radially by an outer wall which is comprised by one of the carrier members. Nonrotating actuating means for changing the pitch of the blades are operatively connected to the first and second blades through first and second thrust bearings respectively.

In another form of the present invention a pitch-changing mechanism for a propeller blade with radially inner shaft is disclosed. The mechanism comprises converting means for converting centrifugal force on the propeller blade when rotating into a pitchchanging force. It also comprises nonrotating actuating means for changing blade pitch. The actuating means are operatively connected to the blade shaft through a thrust bearing.

In a further form of the present invention a lightweight counterrotatable propeller system driven by a rotatable shaft is disclosed. The system includes first and second counterrotatable propellers, each of which includes a plurality of blades mounted on first and second hub assemblies respectively. First and second counterrotatable carrier members are connected to first and second hub assemblies respectively. The carrier members are operatively connected to the shaft through gearing means. The gearing means is bounded radially by an outer wall which is comprised by one of the carrier members.

BRIEF DESCRIPTION OF THE DRAWINGS

FIG. 1 is a sectional view of a counterrotatable propeller system according to one form of the invention.

FIG. 2 is a partial cross-sectional view of a propeller hub and blade shaft.

DETAILED DESCRIPTION OF THE INVENTION

Fig. 1 shows a view of a counterrotatable propeller system according to one form of the present invention. Rotating shaft 10 is operatively connected to gearing means 12. As shown, gearing means 12 includes sun gear 14 carried on the forward end of shaft 10 and which, therefore, rotates with shaft 10. A plurality of planet gears 16 are disposed about and engage sun gear 14. A surrounding ring gear 18 meshes with each of the planet gears 16 and is attached to aft propeller carrier member 20 so that member 20 rotates with ring gear 18. A plurality of aft propeller hubs 42, similar to the forward propeller hubs 40 which are shown in more detail in FIG. 2, are attached to and rotate with member 20.

A planet carrier 22 includes at its forward end a flange portion 24 with a plurality of holes therein aligned with planet gears 16. A forward propeller carrier 36 including flange 38 with holes therein aligned with planet gears 16 is fastened to planet gears 16. Planet carrier 22 and forward propeller carrier 36 are fastened to planet gears 16 by means of bolts 32 which penetrate planet gears 16 and nuts 34. Forward propeller main thrust bearings 25 located near the aft end of carrier 22 provide axial support for planet carrier 22 and forward propeller carrier 36 through stationary propeller support structure 26. A plurality of forward propeller hubs 40, shown in more detail in FIG. 2, are attached to the forward end of carrier 36 and rotate therewith.

The gearing means 12, thus described, is a planetary gear system. This system is capable of delivering counterrotational motion to dual propellers. More specifically, forward propeller hubs 40 rotate with planet gears 16 in the same direction as shaft 10. Aft propeller hubs 42 rotate with ring gear 18 in the opposite direction to shaft 10. Gearing means 12 is a so-called floating system, i.e., there is an inherent torque split between the forward and aft propeller. For example, if the resistance to rotation of aft carrier 20 increases through a change in aft propeller pitch, ring gear 18 will slow down with a corresponding increase in the axial rotation of planet gears 16 and forward carrier 36. Similarly, increased resistance on forward carrier 36 will slow it down while simultaneously speeding up aft carrier 20. It will be clear that such a gearing system can be readily adapted to use with a single propeller by locking either ring gear 18 or planet gears 16. For example, elimination of aft propeller 46 and locking of aft carrier member 20 and ring gear 18 will result in shaft torque being transmitted to forward propeller 44.

As described above, aft carrier member 20 is positioned coaxially with gearing means 12 and radially bounds gearing means 12. Thus, carrier member 20 serves as an outer wall, or rotating sump, for lubricating fluids within the wall. These dual functions of propeller carrier and gear casing result in significant weight savings over prior art propeller systems wherein separate carrier and casing are employed. Gearing means 12 is located axially between forward propeller 44 and aft propeller 46. This unique arrangement is made possible in part by utilizing aft carrier member 20 as a rotating sump. Moreover, additional weight savings are realized by the reduced axial distance between gearing means 12 and propellers 44 and 46 over which torque loads must be transmitted.

Referring still to FIG. 1, a spider 28 with a plurality of forward facing fingers 30 is mounted aft of gearing means 12. Each finger 30 is journaled with a hollow bolt 32 and passes through a planet gear 16. Attached to the forward ends of fingers 30 is forward actuator arm 48 which connects fingers 30 to eccentric pins 50 on the radially inner surface of forward propeller hub shaft 52. Spider 28 rotates with planet gears 16 but is in sliding contact therewith to allow its axial movement through planet gears 16. Axial movement is provided by nonrotating actuating means 54 through a first actuator member 56. The connective interface between the aft end of rotating spider 28 and the forward end of nonrotating first actuator member 56 is provided by a plurality of first thrust bearings 58.

Nonrotating actuating means 54 also provides the actuation force for aft propeller 46. An eccentric pin 60 on the radially inner surface of each aft propeller hub shaft 62 is connected to rotatable aft actuator arm 64. Nonrotating second actuator member 66 is attached to nonrotating actuating means 54. The interface between rotating arm 64 and nonrotating second member 66 is provided by a plurality of second thrust bearings 68. Nonrotating actuating means 54 includes primary nonrotating actuating means 70 for changing the pitch of forward and aft propeller blades 74 and 76, respectively, and secondary nonrotating actuating means 72 for changing the pitch of forward propeller blades 74.

As described above, primary nonrotating actuating means 70 is operatively connected to forward propeller blades 74 and aft propeller blades 76 through first thrust bearings 58 and second thrust bearings 68, respectively. Secondary nonrotating actuating means is operatively connected to forward propeller blades 74 through first thrust bearings 58. In the embodiment shown, primary means 70 comprises forward and aft annular chambers 78 and 80 separated by stationary wall member 82. Each chamber is connected to supply means, not shown, for delivering hydraulic fluid thereto. As a pressure differential is created between chambers 78 and 80, primary means 70 will translate axially thereby moving first actuator member 56 and second actuator member 66 for changing the pitch of forward propeller blades 74 and aft propeller blade 76. Secondary means 72 which includes actuator members 56 and 66 moves in response to primary means 70. In addition, secondary means 72 further includes secondary forward and aft annular chambers 84 and 86 respectively, which function in much the same manner as chambers 78 and 80. When a differential pressure is applied between chambers 84 and 86, first actuator member 56 responds thereby changing the pitch of forward blades 74.

From the above description, it should be clear that primary actuating means 70 provides an initial pitch setting for forward and aft blades and roughly sets the pitch of each blade relative to the other. Secondary actuating means 72 provides further pitch control for the forward blades and finely tunes the relative pitch between forward and aft blades. It will be clear to a person skilled in the art that the present invention is not limited to the embodiment herein described. It applies equally to nonrotating actuators for single propellers. In addition, the secondary actuating means may be operatively connected to the aft propeller. Also, alternate actuating means such as electrical actuators may be used in lieu of the hydraulic actuators herein disclosed.

FIG. 2 shows in greater detail a cross-sectional view of forward propeller 44 as seen from the front of the propeller system looking aft. Propeller 44 includes a plurality of blades 74, each blade having a threaded shaft 52. A plurality of propeller hubs 40 are each adapted to mate with a shaft 52. Each propeller hub 40 is of the ball screw type with a helical channel 84 disposed therein. A corresponding helical channel 86, threaded on shaft 52, is in alignment with channel 84 thereby allowing ball bearings 88 to engage hub 40 and shaft 52 and provide radial retention for shaft 52. In the embodiment shown, the ball screw hub is a double helix with a second thread being formed by a second helical channel 90 on hub 40 and a second helical channel 92 on shaft 52. However, it will be clear to a person skilled in the the art that either a single or multiple helical thread may be advantageously employed.

As propeller 44, including blade 74, and hub 40 rotates, centrifugal force acts in a radially outward direction on blade 74 and shaft 52. A component of this force is directed along the thread. Thus, the ball-screw hub acts as converting means for converting the centrifugal force into a pitch-changing force. The blade also experiences an inherent pitch-changing force resulting from the tendency of a rotating blade to go into flat pitch. Because of the potential danger of engine runaway under such conditions, the pitch angle alpha of the ball screw thread is selected so that the pitch changing force of the ball screw hub exceeds this inherent pitch changing force. By so utilizing the ball screw hub, other more heavy and costly fail-safe devices are obviated. Moreover, by using the ball screw hub to deliver a pitch changing force the actuating means for changing blade pitch need not deliver as large a torque for changing blade pitch. Thus, lighter, simpler and less expensive actuating means, such as disclosed hereinabove, may be used.

It will be clear to those skilled in the art that the present invention is not limited to the specific embodiments described and illustrated herein, nor is it limited to counterrotating propeller blade systems, but it applies equally to single propeller engines. It will be understood that the dimensions and proportional and structural relationships shown in the drawings are illustrated by way of example only and these illustrations are not to be taken as the actual dimensions or proportional structural relationships used in the propeller system of the present invention.

Numerous modifications, variations and full and partial equivalents can be undertaken without departing from the invention as limited only by the spirit and scope of the appended claims.

What is desired to be secured by Letters Patent of the United States is the following:

What is claimed is:

1. An aircraft variable pitch propeller system comprising first and second propellers separately rotatable about a common axis; a planetary gearing means centered on said common axis and axially disposed between said first and second propellers including a sun gear, a plurality of planet gears surrounding and engaging said sun gear, a ring gear surrounding and engaging said planet gears; said planetary gearing means engaging and effecting counterrotation between said first and second propellers respectively about said common axis.

2. An aircraft variable pitch propeller system comprising first and second propellers, said first propeller including a plurality of first blades and said second propeller including a plurality of second blades; forward and aft propeller carrier members supporting first propeller and second propeller, respectively, each separately rotatable about a common axis; a sun gear centered on said common axis and axially disposed between said first and second propellers; means for applying a rotary torque to said sun gear; a planet carrier; a plurality of planet gears supported between said planet carrier and said forward member, said planet gears engaging said sun gear around the periphery of the latter; and a ring gear coaxially surrounding said sun gear and in engagement with said planetary gears, said ring gear being mechanically connected to said aft member; whereby said planetary gears and said ring gear are effective to counterrotate said first and second propellers respectively about said common axis.

3. An aircraft variable pitch propeller system comprising first and second propellers, said first propeller including a plurality of first blades and said second propeller including a plurality of second blades; forward and aft propeller carrier members supporting first propeller and second propeller respectively each separately rotatable about a common axis; a sun gear centered on said common axis and axially disposed between said first and second propellers; means for applying a rotary torque to said sun gear; a planet carrier; a plurality of planet gears supported between said planet carrier and said aft member, said planet gears engaging said sun gear around the periphery of the latter; and a ring gear coaxially surrounding said sun gear and in engagement with said planetary gears, said ring gear being mechanically connected to said forward member; whereby said planetary gears and said ring gear are effective to counterrotate said first and second propellers respectively about said common axis.

4. An aircraft propeller system comprising:
first and second propellers, said first propeller including a plurality of first blades and said second propeller including a plurality of second blades; each of said blades having a radially inner threaded shaft;
forward and aft propeller carrier members each separately rotatable about a common axis;
said forward member including a plurality of first ball screw hubs, each of said first hubs being adapted to mate with one of said first blade shafts;
said aft member including a plurality of second ball screw hubs, each of said second hubs being adapted to mate with one of said second blade shafts;
means in each of said hubs for converting the centrifugal force on each of said propeller blades when rotating into a pitch changing force;
primary nonrotating actuating means for changing the pitch of said first and second blades, said primary means being operatively connected to each of said first blades through a first set of thrust bearings and being operatively connected to said second blades through a second set of thrust bearings;
secondary nonrotating actuating means for changing the pitch of either said first or second blades, said secondary means being operatively connected to said blades through said first or second set of thrust bearings, respectively;
a sun gear centered on said common axis between said forward and aft propeller carrier members;
means for applying a rotary torque to said gear;
a planet carrier:
a plurality of planet gears supported between said planet carrier and said forward member, said planet gears engaging said sun gear around the periphery of the latter; and
a ring gear coaxially surrounding said sun gear and in engagement with said planetary gears, said ring gear being mechanically connected to said aft member;
whereby said planetary gears and said ring gear are effective to counterrotate said first and second propellers respectively about said common axis.

5. A system, as recited in claim 4, wherein said aft member forms the outer wall of a rotatable sump enclosing said gears.

6. A lightweight counterrotatable propeller system driven by a rotatable shaft comprising:
first and second counterrotatable propellers, said first propeller including a plurality of first blades and said second propeller including a plurality of second blades, each of said blades including a threaded shaft;
a plurality of first and second ball screw hubs, each of said first hubs being adapted to mate with one of said first blade shafts, and each of said second hubs being adapted to mate with one of said second blade shafts, wherein each of said hubs converts the centrifugal force on each of said propeller blades when rotating into a pitch changing force;
first and second counterrotatable carrier members connected to said first and second hubs respectively;
planetary gearing means axially disposed between said first and second propellers for operatively connecting said shaft with said first and second carrier members; and
at least one of said carrier members forming the outer wall of a rotatable sump enclosing said gearing means.

7. The system, as recited in claim 6, further comprising:
primary nonrotating actuating means for changing the pitch of said first and second blades, wherein said primary actuating means is operatively connected to each of said first blades through a first set of thrust bearings and said means is operatively connected to said second blades through a second set of thrust bearings.

8. The system, as recited in claim 7, further comprising:
secondary nonrotating actuating means for changing the pitch of either said first or second blades, wherein said secondary means is operatively connected to said blades through said first or second set of thrust bearings, respectively.

9. An aircraft propeller system comprising:
first and second propellers, said first propeller including a plurality of first variable pitch blades and said second propeller including a plurality of second variable pitch blades; each of said first blades having a radially inner shaft and a pitch changing mechanism;
forward and aft propeller carrier members each separately rotatable about a common axis;
said forward member including a plurality of first hubs, each of said first hubs being adapted to mate with one of said first blade shafts;
said aft member including a plurality of second hubs, each of said second hubs being adapted to mate with one of said second blade shafts;
primary nonrotating actuating means for changing the pitch of said first and second blades, said primary means being operatively connected to each of said first blades through a first set of thrust bearings and being operatively connected to said second blades through a second set of thrust bearings;
secondary nonrotating actuating means for changing the pitch of either said first or second blades, said secondary means being operatively connected to said blades through said first or second set of thrust bearings, respectively;
a planetary gear system centered on said common axis and axially spaced between said first and second propellers comprising;
a sun gear centered on said common axis,
a planet carrier,
a plurality of planet gears supported between said planet carrier and said forward member, said planet gears engaging said sun gear around the periphery of the latter; and
a ring gear coaxially surrounding said sun gear and in engagement with said planetary gears, said ring gear being mechanically connected to said aft member;
whereby said planetary gears and said ring gear are effective to counterrotate said first and second propellers respectively about said common axis.

10. An aircraft propeller system comprising:
first and second propellers, said first propeller including a plurality of first variable pitch blades and said second propeller including a plurality of second variable pitch blades;
wherein each of said first blades includes a radially inner rotatable shaft and a shaft rotating means attached to said shaft effective for varying the pitch of said blade;
forward and aft propeller carrier members each separately rotatable about a common axis;
said forward member including a plurality of first hubs, each of said first hubs being adapted to mate with one of said first blade shafts;
said aft member including a plurality of second hubs, each of said second hubs, each of said second hubs being adapted to mate with one of said second blade shafts;
primary nonrotating actuating means for changing the pitch of said first and second blades, said primary means being operatively connected to each of said first blades through a first set of thrust bearings and being operatively connected to said second blades through a second set of thrust bearings;
secondary nonrotating actuating means for changing the pitch of either said first or second blades, said secondary means being operatively connected to said blades through said first or second set of thrust bearings, respectively;
a planetary gear system centered on said common axis and axially spaced between said first and second propellers comprising,
a sun gear centered on said common axis,
means for applying a rotary torque to said sun gear,
a planet carrier,
a plurality of planet gears supported between said planet carrier and said forward member, said planet gears engaging said sun gear around the periphery of the latter; and
a ring gear coaxially surrounding said sun gear and in engagement with said planetary gears, said ring gear being mechanically connected to said aft member;
whereby said planetary gears and said ring gear are effective to counterrotate said first and second propellers respectively about said common axis; and
a plurality of fingers each axially journaled in one of said planetary gears, each of said fingers being mechanically connected to a respective thrust bearing of said first set and being adapted to transmit the linear force of the latter to a corresponding one of said first shaft rotating means.

11. An aircraft propeller system, as recited in claim 10, wherein said shaft rotating means comprises an eccentric pin on radially inner surface of said shaft and an actuator arm pivotally connected to said pin.

12. An aircraft propeller system comprising first and second propellers, said first propeller including a plurality of first variable pitch blades and said second propeller including a plurality of second variable pitch blades; each of said first blades having a radially inner shaft and a pitch changing mechanism attached to said shaft;
- a primary nonrotating actuating means for changing the pitch of said first and second blades, said primary actuating means being operatively connected to each of said first blades through a first set of thrust bearings and being operatively connected to said second blades through a second set of thrust bearings;
- a secondary nonrotating actuating means for changing the pitch of either said first or second blades, said secondary means being operatively connected to said blades through said first or second set of thrust bearings, respectively;
- a planetary gear system centered on said common axis and axially spaced between said first and second propellers comprising,
- a planet carrier,
- a plurality of planet gears supported between said planet carrier and said forward propellers, and
- a ring gear coaxially surrounding said sun gear and in engagement with said planetary gears,
- whereby said planetary gears and said ring gear are effective to counterrotate said first and second propellers respectively about said common axis; and
- a plurality of fingers each axially journaled in one of said planetary gears, each of said fingers being mechanically connected to a respective thrust bearing of said first set and being adapted to transmit the linear force of the latter to a corresponding one of said pitch changing mechanisms.

13. An aircraft propeller system comprising:
first and second propellers, said first propeller including a plurality of first blades and said second propeller including a plurality of second blades; each of said blades having a radially inner threaded shaft;
- forward and aft propeller carrier members each separately rotatable about a common axis;
- said forward member including a plurality of first ball screw hubs, each of said first hubs being adapted to mate with one of said first blade shafts;
- said aft member including a plurality of second ball screw hubs, each of said second hubs, each of said second hubs being adapted to mate with one of said second blade shafts;
- means in each of said hubs for converting the centrifugal force on each of said propellers when rotating into a pitch changing force;
- primary nonrotating actuating means for changing the pitch of said first and second blades, said primary means being operatively connected to each of said first blades through a first set of thrust bearings and being operatively connected to said second blades through a second set of thrust bearings;
- secondary nonrotating actuating means for changing the pitch of either said first or second blades, said secondary means being operatively connected to said blades through said first or second set of thrust bearings, respectively;
- a sun gear centered on said common axis;
- means for applying a rotary torque to said sun gear;
- a planet carrier;
- a plurality of planet gears supported between said planet carrier and said forward member, said planet gears engaging said sun gear around the periphery of the latter;
- a ring gear coaxially surrounding said sun gear and in engagement with said planetary gears, said ring gear being mechanically connected to said aft member;
- whereby said planetary gears and said ring gear are effective to counterrotate said first and second propellers respectively about said common axis;
- wherein said first set of thrust bearings and said plurality of first hubs are positioned on opposite sides of said planetary gears; and
- a plurality of fingers each axially journaled in one of said planetary gears, each of said fingers being mechanically connected to a respective thrust bearing of said first set and being adapted to transmit the linear force of the latter to a corresponding one of said first shafts.

* * * * *